(12) United States Patent
Hamaguchi

(10) Patent No.: US 9,168,611 B2
(45) Date of Patent: Oct. 27, 2015

(54) LASER CUTTING METHOD

(75) Inventor: Yuji Hamaguchi, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 333 days.

(21) Appl. No.: 13/818,228

(22) PCT Filed: Oct. 14, 2011

(86) PCT No.: PCT/JP2011/073712
§ 371 (c)(1),
(2), (4) Date: Feb. 21, 2013

(87) PCT Pub. No.: WO2012/053452
PCT Pub. Date: Apr. 26, 2012

(65) Prior Publication Data
US 2013/0146573 A1 Jun. 13, 2013

(30) Foreign Application Priority Data
Oct. 19, 2010 (JP) .................................. 2010-234722

(51) Int. Cl.
*B23K 26/06* (2014.01)
*B23K 26/14* (2014.01)
(Continued)

(52) U.S. Cl.
CPC ............... *B23K 26/06* (2013.01); *B23K 26/046* (2013.01); *B23K 26/14* (2013.01);
(Continued)

(58) Field of Classification Search
CPC ...... B23K 26/046; B23K 26/06; B23K 26/14; B23K 26/4085; B23K 26/38; B23K 26/40; B23K 26/1476; B23K 26/0639; H01M 2/30; H01M 10/04; H01M 10/058

USPC ................................ 219/121.67, 121.6, 121.7
See application file for complete search history.

(56) References Cited

U.S. PATENT DOCUMENTS 3,549,733 A * 12/1970 Caddell .......................... 264/400
4,503,313 A * 3/1985 Tsutsumi .................. 219/121.67
(Continued)

FOREIGN PATENT DOCUMENTS

| CN | 101797666 A | 11/2010 |
|---|---|---|
| DE | 10 2006 012 984 A1 | 10/2007 |

(Continued)

OTHER PUBLICATIONS

Chinese Office Action, Apr. 30, 2014, 5 pages.

*Primary Examiner* — Tu B Hoang
*Assistant Examiner* — Kristopher Reichlen
(74) *Attorney, Agent, or Firm* — Foley & Lardner LLP

(57) ABSTRACT

The laser cutting method for cutting a pair of plate materials, each of which has a different thickness and melting point, by irradiating them with a laser is provided with a plate material placement process for placing the pair of plate materials side by side so that, out of the pair of plate materials, an opposite surface of a laser irradiated surface of a plate material with a lower melting point protrudes more than an opposite surface of a laser irradiated surface of a plate material with a higher melting point, a focus adjustment process for aligning a focus position of the laser with an undersurface opposite the laser irradiated surface of the plate material with a higher melting point out of the pair of plate materials, and a plate material cutting process for cutting the pair of plate materials through irradiation with the laser according to a series of operations while sustaining a focus position of the laser to the pair of plate materials.

8 Claims, 6 Drawing Sheets

(51) Int. Cl.
  *H01M 2/30* (2006.01)
  *B23K 26/40* (2014.01)
  *H01M 10/04* (2006.01)
  *B23K 26/04* (2014.01)
  *B23K 26/38* (2014.01)
  *H01M 10/058* (2010.01)

(52) U.S. Cl.
  CPC ........ *B23K 26/1476* (2013.01); *B23K 26/4085* (2013.01); *H01M 2/30* (2013.01); *H01M 10/04* (2013.01); *B23K 26/0639* (2013.01); *B23K 26/381* (2013.01); *H01M 10/058* (2013.01)

(56) References Cited

U.S. PATENT DOCUMENTS

| | | | |
|---|---|---|---|
| 5,902,697 A * | 5/1999 | Guindy et al. | 429/153 |
| 6,642,474 B2 * | 11/2003 | Delle Piane et al. | 219/121.64 |
| 7,662,265 B2 * | 2/2010 | Chiang et al. | 204/491 |
| 8,410,395 B2 * | 4/2013 | Mienhardt | 219/121.69 |
| 2002/0007552 A1 * | 1/2002 | Singleton et al. | 29/623.3 |
| 2002/0153358 A1 * | 10/2002 | Inoue et al. | 219/121.6 |
| 2006/0196859 A1 * | 9/2006 | Bertez et al. | 219/121.72 |
| 2008/0128953 A1 * | 6/2008 | Nagai et al. | 264/400 |
| 2009/0142659 A1 * | 6/2009 | Lai et al. | 429/163 |
| 2012/0031883 A1 * | 2/2012 | Kumamoto et al. | 219/121.78 |

FOREIGN PATENT DOCUMENTS

| | | | |
|---|---|---|---|
| JP | 01-099790 A | | 4/1989 |
| JP | 1-273682 A | | 11/1989 |
| JP | 09019780 A | * | 1/1997 |
| JP | 2001-176501 A | | 6/2001 |
| JP | 2005-118818 A | | 5/2005 |
| JP | 2007-014993 A | | 1/2007 |
| WO | WO 2011/120345 A1 | * | 10/2011 |

* cited by examiner

LASER CUTTING METHOD

FIELD OF THE INVENTION

The present invention relates to a laser cutting method for cutting a workpiece by a laser.

BACKGROUND

There has been known a laser cutting method for melting and cutting a workpiece by irradiating the workpiece with a condensed laser. Japanese Unexamined Patent Application Publication No. 2001-176501 discloses a method for cutting an electrode of a laminated battery by a laser. According to the method, a workpiece is a collector which is coated with an active material on the surface and constitutes an electrode. In comparison with cutting by pressing, laser cutting makes it possible to suppress generation of a burr caused by friction due to a press die.

SUMMARY

When a pair of plate materials with different thicknesses is cut by laser cutting, it is generally required to change cutting conditions according to thicknesses of the plate materials and apply laser cutting under cutting conditions suitable for each of the plate materials. Therefore, in order to cut a pair of plate materials with different thicknesses continuously, excessive time might be spent for changing cutting conditions.

The present invention was achieved by focusing attention on such problems and aims to provide a laser cutting method which enables suppression of the height of a burr in cutting and reduction of time spent for processing a pair of plate materials with different thicknesses.

In order to achieve the above object, in the laser cutting method for cutting a pair of plate materials with different thicknesses and melting points by irradiating the plate materials with a laser according to one embodiment of the present invention, the pair of plate materials is arranged side by side so that, out of the pair of plate materials, an opposite surface of a laser irradiated surface of a plate material with a lower melting point protrudes more than an opposite surface of a laser irradiated surface of a plate material with a higher melting point, a focus position of the laser is aligned with an undersurface opposite the laser irradiated surface of the plate material with a higher melting point out of the pair of plate materials, and the pair of plate materials is cut according to a series of operations through irradiation with the laser while sustaining a focus position of the laser relative to the pair of plate materials.

An embodiment and advantages of the present invention are described in detail below with reference to the accompanying drawings.

DETAILED DESCRIPTION

Figure 1:
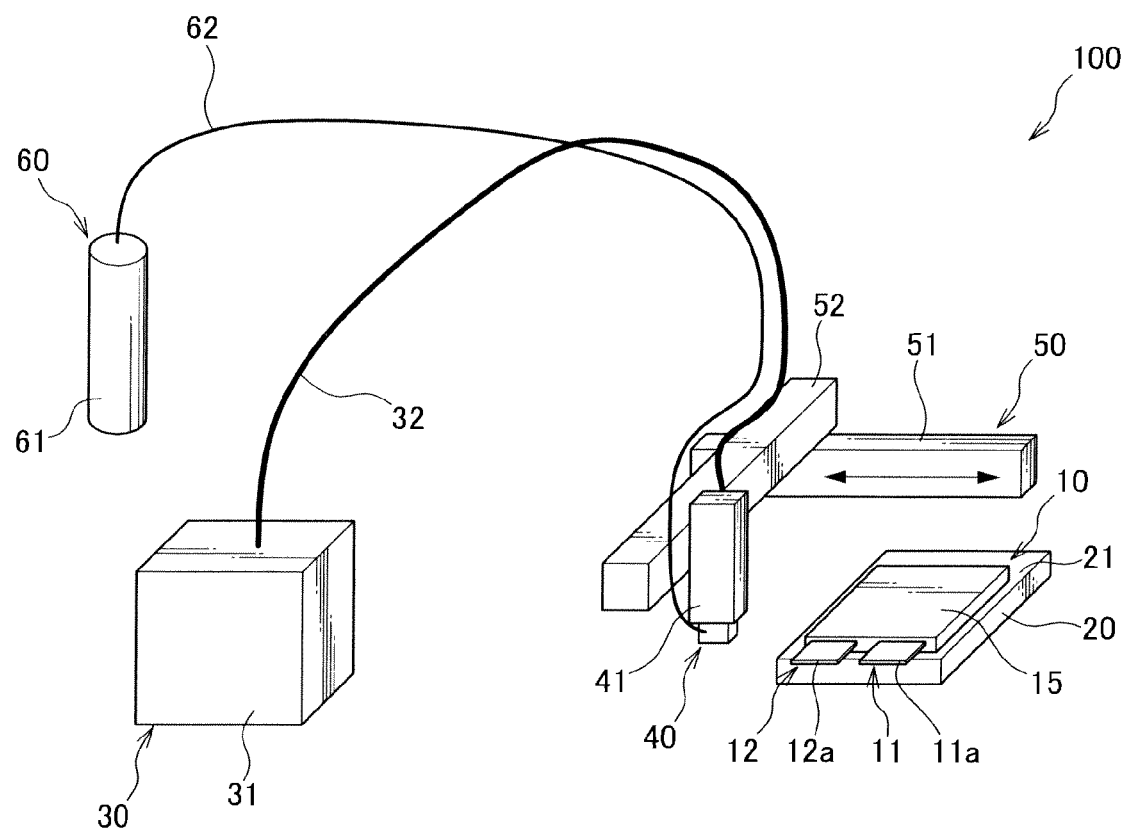
FIG. 1 is a configuration diagram showing a laser cutting device for use in a laser cutting method according to one embodiment of the present invention.

Firstly, with reference to FIG. 1 and FIG. 2, a laminated battery 10 which is a workpiece having a positive electrode tab 11a and a negative electrode tab 12a will be explained.

In the laminated battery 10, a positive electrode 11 and a negative electrode 12 are laminated via a porous film separator (not shown) and internally accommodated along with an electrolyte in a laminate pack 15. The laminated battery 10 is a laminated cell such as lithium ion secondary battery.

The positive electrode 11 is provided with a positive electrode collector foil (not shown) coated with a positive electrode active material (not shown) and the positive electrode tab 11a joined to the positive electrode collector foil. The positive electrode active material is formed by lithium transition metal oxide such as, for example, lithium cobaltate and lithium manganate. The positive electrode collector foil is formed by a metal such as, for example, aluminum.

Figure 2:
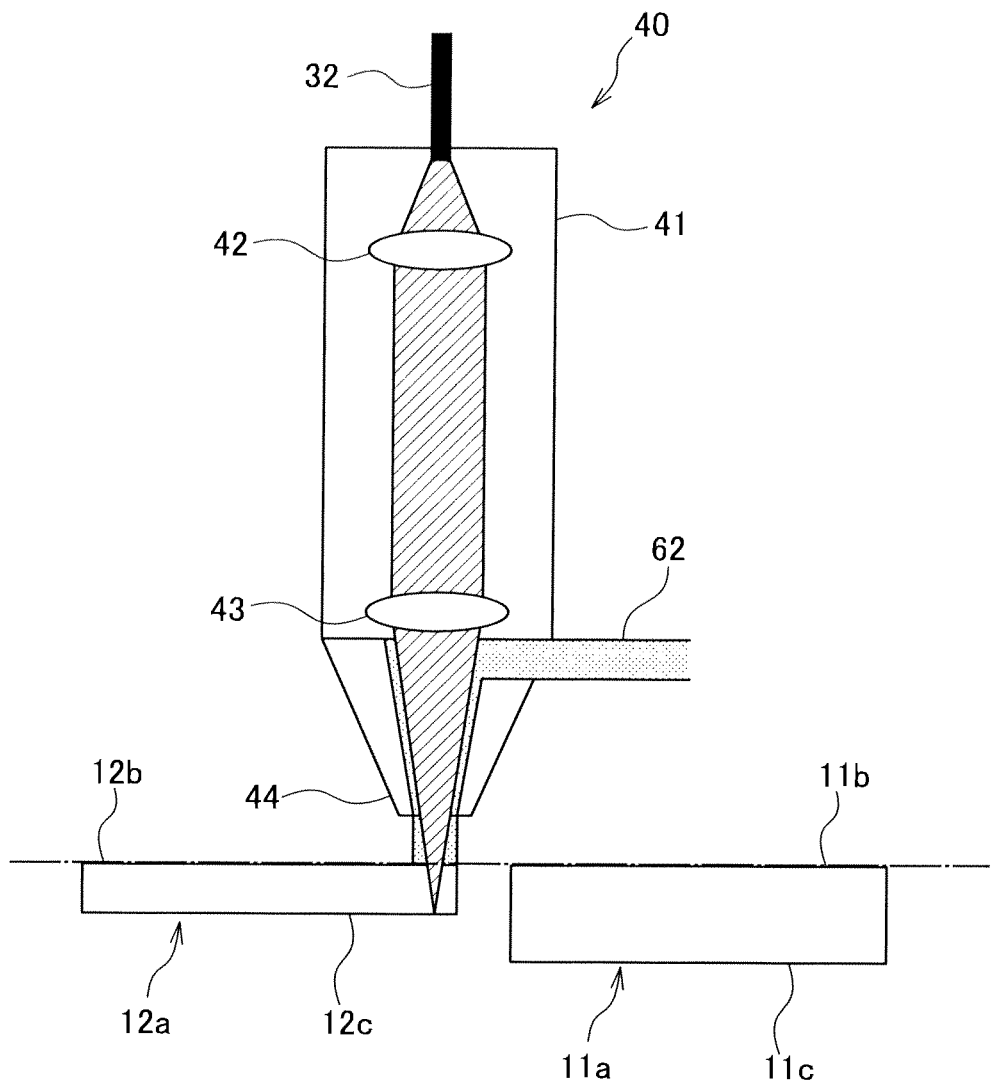
FIG. 2 is an expanded view of the periphery of a machining head in the laser cutting device of FIG. 1.
Figures 3A, 3B:
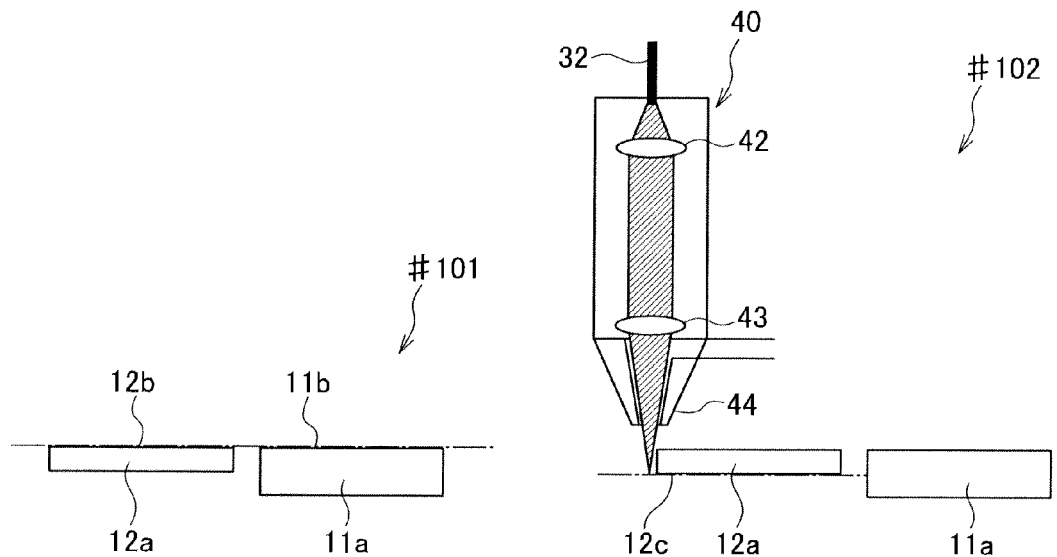
FIG. 3A is a diagram explaining a plate material placement process in the laser cutting method according to one embodiment of the present invention.
FIG. 3B is a diagram explaining a focus adjustment process in the laser cutting method according to one embodiment of the present invention.
Figures 3C, 3D:
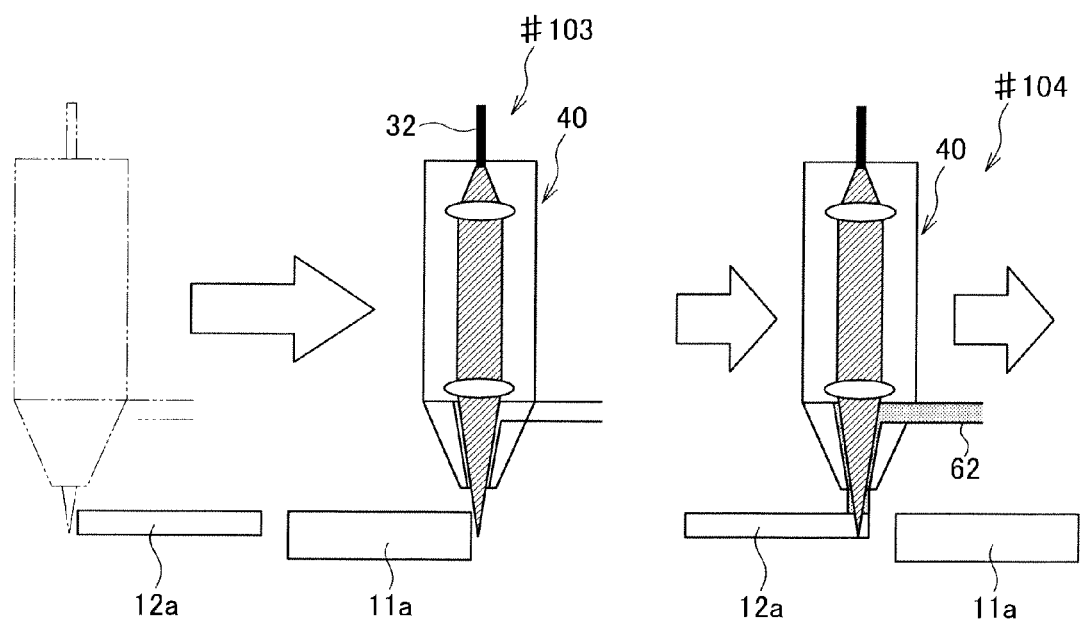
FIG. 3C is a diagram explaining a plate material cutting process in the laser cutting method according to one embodiment of the present invention.
FIG. 3D is a diagram explaining a gas blowing process in the laser cutting method according to one embodiment of the present invention.

As shown in FIG. 2, the positive electrode tab 11a is a plate material having a laser irradiated surface 11b which is irradiated with a laser and an opposite surface 11c of the laser irradiated surface 11b. Here, the positive electrode tab 11a is formed by aluminum with a thickness of 0.4 mm which is thicker than the positive electrode collector foil.

The negative electrode 12 is provided with a negative electrode collector foil (not shown) coated with a negative electrode active material (not shown), and the negative electrode tab 12a joined to the negative electrode collector foil. The negative electrode active material is formed by a carbon-based material such as, for example, hard carbon and graphite. The negative electrode collector foil is formed by a metal such as, for example, copper.

As shown in FIG. 2, the negative electrode tab 12a is a plate material similarly having a laser irradiated surface 12b irradiated with a laser and an opposite surface 12c of the laser irradiated surface 12b. Here, the negative electrode tab 12a is formed by copper with a thickness of 0.2 mm which is thicker than the negative electrode collector foil.

The positive electrode tab 11a and the negative electrode tab 12a are different to each other in terms of thickness and melting point. More specifically, the negative electrode tab 12a is formed to be thinner than the positive electrode tab 11a. Also, in comparison with the positive electrode tab 11a formed by aluminum, the negative electrode tab 12a formed by copper or other metals has a high melting point.

The positive electrode tab 11a and the negative electrode tab 12a are arranged side by side so that the laser irradiated surface 11b and the laser irradiated surface 12b are flush with each other. In other words, the positive electrode tab 11a and the negative electrode tab 12a are arranged side by side so that the opposite surface 11c of the positive electrode tab 11a whose melting point is relatively low protrudes downward more than the opposite surface 12c of the negative electrode tab 12a whose melting point is relatively high as shown in FIG. 2. These positive electrode tab 11a and negative electrode tab 12a correspond to the pair of plate materials.

Next, with reference to FIG. 1 and FIG. 2, a laser cutting device 100 for use in a laser cutting method according to an embodiment of the present invention will be explained.

The laser cutting device 100 irradiates the positive electrode tab 11a and the negative electrode tab 12a with a condensed laser so as to melt and cut them. The laser cutting device 100 is provided with a table 20 on which the laminated battery 10 is mounted, a laser supply device 30 for supplying a laser, a machining head 40 for performing laser irradiation, and an XY stage 50 for moving the machining head 40 in two directions.

The table 20 has a top surface 21 on which the laminated battery 10 is mounted. The table 20 holds only a laminate pack 15 when the laminated battery 10 is mounted thereon, and is formed into a size in which the positive electrode tab 11a and the negative electrode tab 12a protrude to the outside.

The laser supply device 30 is provided with a laser oscillator 31 for oscillating a laser, and an optical fiber 32 for transmitting the laser.

The laser oscillator 31 outputs a fiber laser which is oscillated by fiber itself. The laser oscillated by the laser oscillator 31 is a single-mode fiber laser with high energy density in which laser light energy is distributed in a single mode. The single-mode fiber laser is suitable for microfabrication because of the high beam quality and excellent light condensing property.

The optical fiber 32 connects the laser oscillator 31 and the machining head 40. The laser oscillated by the laser oscillator 31 is transmitted to the machining head 40 by passing through the optical fiber 32.

As shown in FIG. 2, the machining head 40 is provided with a collimator lens 42 and a collector lens 43 that are placed coaxially inside a main body 41. The laser transmitted by the optical fiber 32 is turned into parallel rays after passing through the collimator lens 42 and condensed to a focal point after passing through the collector lens 43. A nozzle 44 is formed at the tip of the machining head 40 and the laser is irradiated from the nozzle 44 to the outside.

As shown in FIG. 1, the machining head 40 is held by the XY stage 50. The XY stage 50 is provided with an X axis 51 for moving the machining head 40 in a width direction of the positive electrode tab 11a and the negative electrode tab 12a and a Y axis 52 for moving the machining head 40 in a length direction of the positive electrode tab 11a and the negative electrode tab 12a. Therefore, the machining head 40 is allowed to perform parallel transition while sustaining a focus position of the laser relative to the positive electrode tab 11a and the negative electrode tab 12a.

Here, if the machining head 40 is arranged to be movable in the height direction, an error in moving the machining head 40 in the height direction is likely to affect a focus position of the laser. Therefore, the machining head 40 is fixed so as not to move in the height direction. As a result, the machining head 40 serves as a fixed optical system and it is possible to prevent deviation of a focus position of the laser caused by an error in moving the machining head 40 in the height direction. In addition, owing to no mechanism required to move the machining head 40 in the height direction, the facility is simplified with reduction of costs.

The laser cutting device 100 is also provided with a gas supply device 60 for supplying an assist gas which is blown to the positive electrode tab 11a and the negative electrode tab 12a, coaxially with the laser.

The gas supply device 60 is provided with a gas tank 61 for storing a compressed high pressure gas, and a pipe 62 for connecting the gas tank 61 and the machining head 40.

The gas tank 61 is filled with an assist gas for assisting laser cutting. The gas tank 61 is connected to the machining head 40 by the pipe 62 and an assist gas is supplied to the machining head 40.

The assist gas here is compressed air. The assist gas is blown to a portion which is cut by the laser so as to blow off and remove an evaporated molten. Therefore, it is possible to suppress adhesion of a molten material to a workpiece. The assist gas can be used selectively depending on a material to be cut. As the assist gas, oxygen, nitrogen and argon or the like may also be used.

Next, the laser cutting method in the laser cutting device 100 will be explained by mainly referring to FIG. 3A to FIG. 3D.

Firstly, the laminated battery 10 is mounted on the top surface 21 of the table 20 and the positive electrode tab 11a and the negative electrode tab 12a are arranged in parallel with each other so that the laser irradiated surface 11b is flush with the laser irradiated surface 12b (i.e. plate material placement process #101). Here, since the laminated battery 10 is formed such that the laser irradiated surface 11b and the laser irradiated surface 12b are flush with each other, placement of the electrodes is completed by simply placing the laminated battery 10 on the top surface 21 of the table 20.

Next, a focus position of the laser irradiated from the machining head 40 is adjusted so as to be aligned with the undersurface 12c of the negative electrode tab 12a. That is, a focus position of the laser is aligned with the undersurface 12c opposite the laser irradiated surface 12b of a thinner plate material selected out of the positive electrode tab 11a and the negative electrode tab 12a (i.e. focus adjustment process #102). It is possible to adjust a focus position of the laser by adjusting a fixed position of the machining head 40 in an optical axis direction (i.e. vertical direction in FIG. 2) and adjusting a fixed position of the condenser lens 43 in the optical axis direction. Here, the machining head 40 is a fixed optical system and a focus position of the laser is aligned with the undersurface 12c of the negative electrode tab 12a by mounting the laminated battery 10 on the top surface 21 of the table 20.

Next, with the laser being irradiated from the machining head 40, the XY stage 50 is driven to cause parallel transition of the machining head 40. More specifically, the machining head 40 is moved while sustaining a focus position of the laser relative to the positive electrode tab 11a and the negative electrode tab 12a. Here, an output of the laser is set to 300 W.

With reference to FIG. 1, the machining head 40 moves in a direction of the X axis 51 to cut the positive electrode tab 11a and the negative electrode tab 12a continuously by the laser (i.e. plate material cutting process #103). Therefore, the positive electrode tab 11a and the negative electrode tab 12a are cut into a desired length.

At this time, an assist gas emitted from the gas supply device 60 is blown to the positive electrode tab 11a and the negative electrode tab 12a along with the laser irradiated from the machining head 40 (i.e. gas blowing process #104). The positive electrode tab 11a and the negative electrode tab 12a are cut continuously by the laser while sustaining conditions to supply the assist gas constant. The assist gas is supplied with a pressure of 1.5 MPa.

In the positive electrode tab 11a and the negative electrode tab 12a, a molten metal in a portion which was melt through irradiation with the laser (i.e. product generated by cutting) is blown off by the assist gas. Therefore, adhesion of a molten metal to a cut part is suppressed.

Note that continuous laser cutting in the present embodiment means cutting the positive electrode tab 11a and the negative electrode tab 12a according to a series of operations while sustaining conditions to output the laser and supply the assist gas constant.

Figure 4:
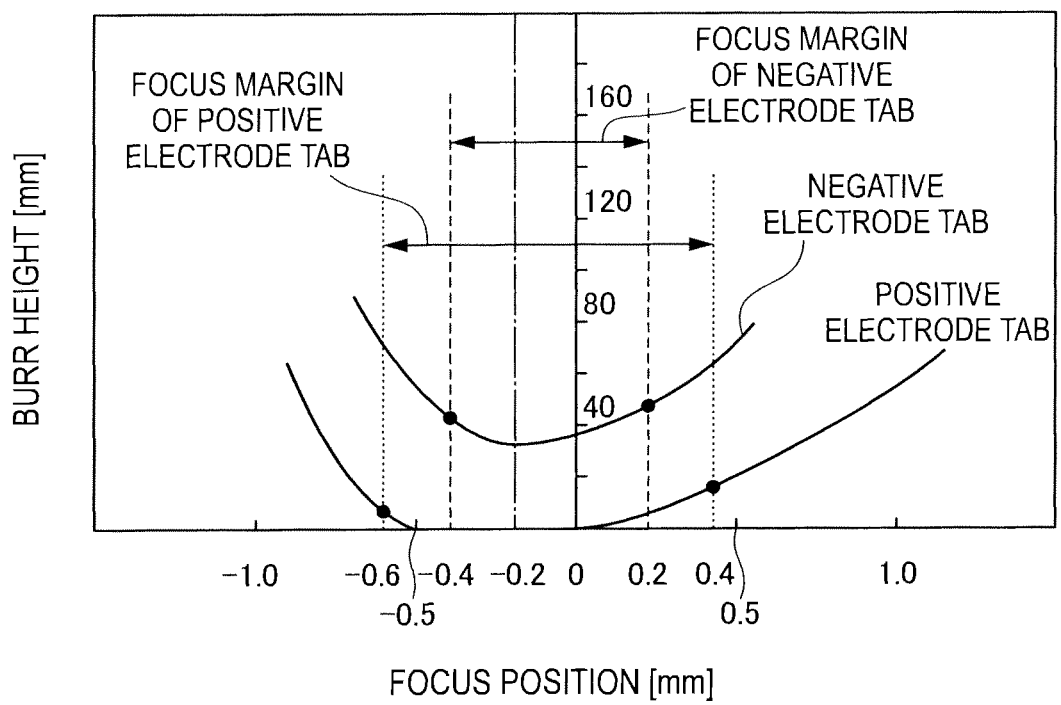
FIG. 4 is a graph showing how a change made in the laser focus position affects the height of a burr.
Figure 5A:
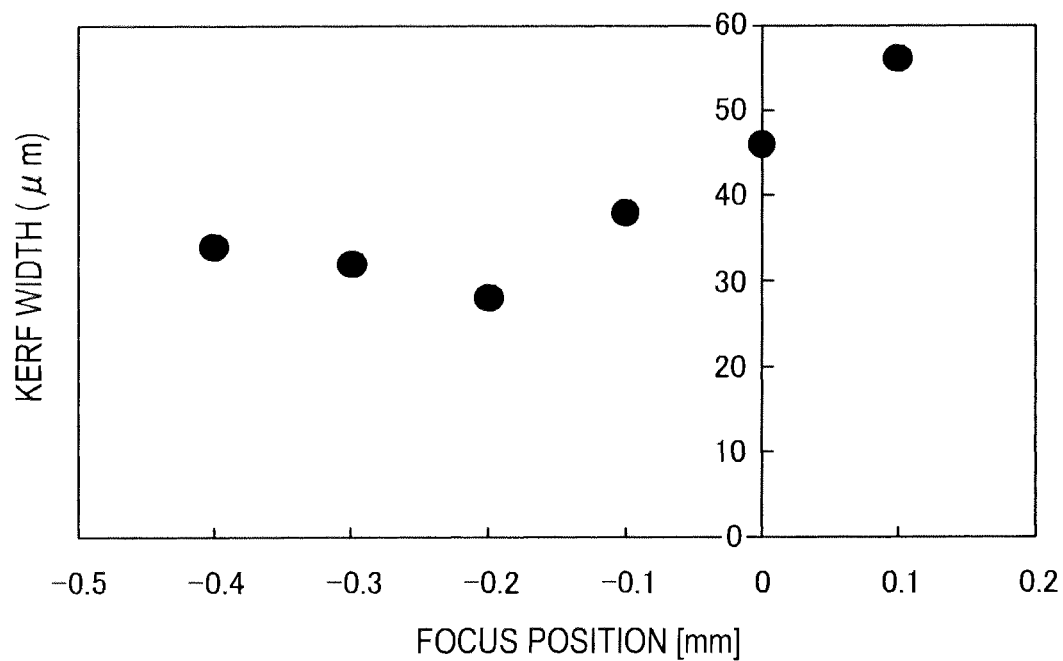
FIG. 5A is a graph showing how a change made in the laser focus position affects the width of a kerf.
Figure 5B:
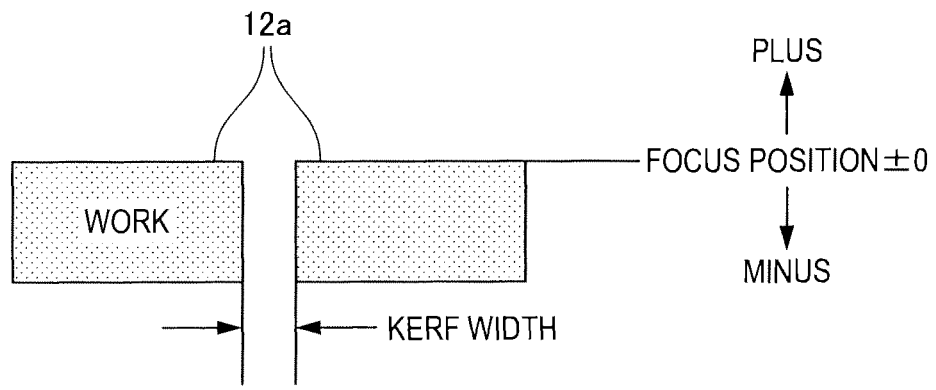
FIG. 5B is a diagram explaining the width of a kerf.
Figure 6:
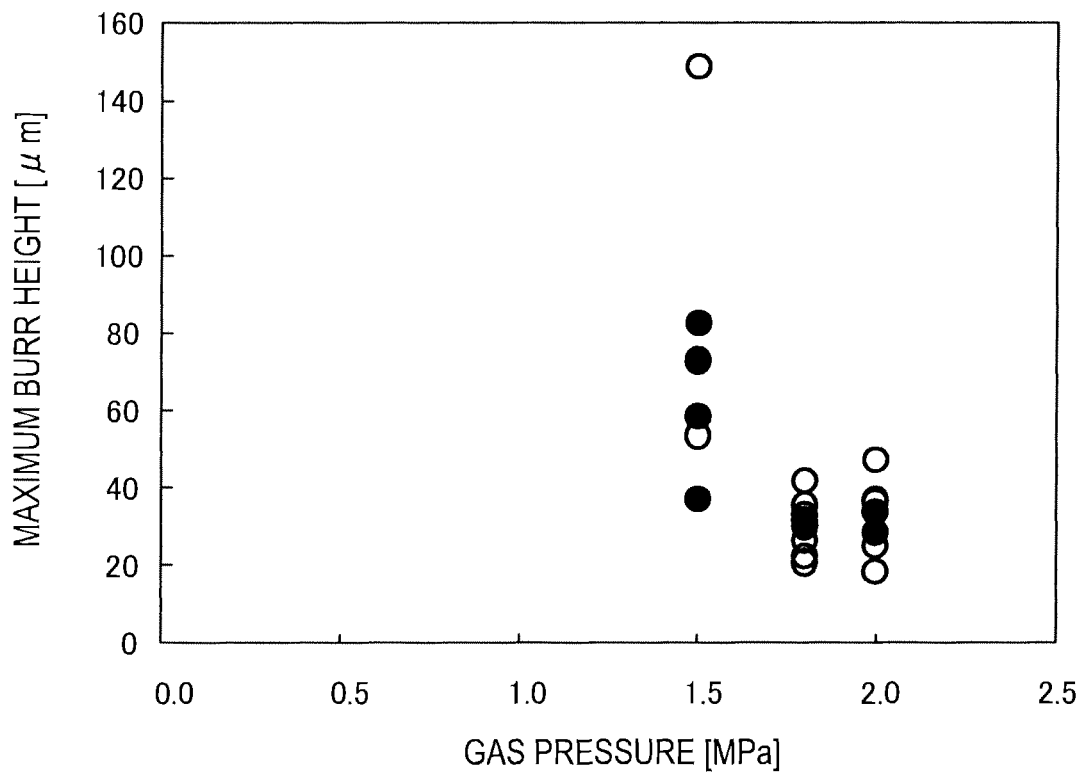
FIG. 6 is a graph showing how a change made in the gas pressure of an assist gas affects the maximum burr height.

With reference to FIG. 4 to FIG. 6, the action and effect of the laser cutting method according to the embodiment of the present invention will be explained.

In FIG. 4, the horizontal axis refers to the focus position of the laser (mm) observed on the assumption that the laser irradiated surface 11b and the laser irradiated surface 12b are zero, and the vertical axis refers to the height of a burr (μm) generated by laser cutting. One-dot chain line shown in FIG. 4 refers to a focus position of the laser as −0.2 mm.

The positive electrode tab 11a is formed to be thicker than the positive electrode collector foil and the negative electrode tab 12a is formed to be thicker than the negative electrode collector foil. Therefore, when the positive electrode tab 11a and the negative electrode tab 12a are cut by the laser, a burr is likely to occur more often than the case of cutting the positive electrode collector foil and the negative electrode collector foil by the laser.

Shown by two curved lines in the graph of FIG. 4 are heights of burrs (μm) corresponding to focus positions of the laser in the positive electrode tab 11a and the negative electrode tab 12a. As shown in FIG. 4, when a focus position of the laser falls in a range from 0 mm to −0.5 mm, the height of a burr in the positive electrode tab 11a falls to zero which is the smallest. Meanwhile, the negative electrode tab 12a has the smallest height of a burr when a focus position of the laser falls in about −0.2 mm.

Here, because a focus position is aligned with the undersurface 12c of the negative electrode tab 12a, the laser is focused in a position which is −0.2 mm apart from the laser irradiated surface 12b corresponding to the thickness of the negative electrode tab 12a. From the graph shown in FIG. 4, it is understood that the height of burrs is suppressed to the minimum in both the positive electrode tab 11a and the negative electrode tab 12a when a focus position of the laser falls in −0.2 mm.

This is because scattering of the laser is suppressed in the interval of plate thicknesses between the positive electrode tab 11a and the negative electrode tab 12a by aligning a focus position of the laser with the undersurface 12c the negative electrode tab 12a, in comparison with the case of aligning a focus position of the laser with the top surface of the positive electrode tab 11a and the negative electrode tab 12a.

As a result, ruining of a cut surface by a scattered laser which melts the positive electrode tab 11a and the negative electrode tab 12a more than necessary can be suppressed. Accordingly, the height of a burr generated in cutting the positive electrode tab 11a and the negative electrode tab 12a can be suppressed.

As stated above, when a focus position of the laser is aligned with the undersurface 12c of the negative electrode tab 12a, the height of a burr can be suppressed to the minimum in both the positive electrode tab 11a and the negative electrode tab 12a. It is therefore possible to cut the positive electrode tab 11a and the negative electrode tab 12a, each of which has a different thickness, by the laser continuously while sustaining a focus point of the laser constant. Accordingly, it is unnecessary to change laser cutting conditions in the middle of laser cutting and time spent for processing the positive electrode tab 11a and the negative electrode tab 12a, each of which has a different thickness, can be made shorter.

Also, as shown by dotted lines in FIG. 4, the height of a burr can be suppressed within a permissible range in the positive electrode tab 11a when a focus position of the laser falls in a range from −0.6 mm to 0.4 mm, whereas the height of a burr increases rapidly and cannot be suppressed within a permissible range if the laser falls beyond the range. Unless the height of a burr is suppressed within a permissible range, it is likely to be unable to cut the positive electrode tab 11a. As a result, the margin of a focus position of the laser (referred to as "focus margin" hereinafter) considered when the positive electrode tab 11a has a plate thickness of 0.4 mm can be in a range from −0.6 mm to 0.4 mm, and a width of the focus margin is 1.0 mm.

Meanwhile, as shown by broken lines in FIG. 4, the height of a burr in the negative electrode tab 12a can be suppressed within a permissible range when a focus position of the laser falls in a range from −0.4 mm to 0.2 mm, whereas the height of a burr increases rapidly and cannot be suppressed within a permissible range if the laser falls beyond the range. Unless the height of a burr is suppressed within a permissible range, it is likely to be unable to cut the negative electrode tab 12a. As a result, a focus margin considered when the negative electrode tab 12a has a plate thickness of 0.2 mm can be in a range from −0.4 mm to 0.2 mm, and the width of the focus margin is 0.6 mm.

Here, the width of the focus margin varies depending on the melting point and the plate thickness of the electrode tabs. More specifically, as the melting point of the electrode tabs is higher or the plate thickness thereof is larger, it becomes more difficult to cut the electrode tab, whereby resulting in a narrower width of the focus margin.

In the case of the present embodiment, the width of the focus margin of the positive electrode tab 11a is larger than the width of the focus margin of the negative electrode tab 12a. Accordingly, when laser cutting is applied in a range of the focus margin of the negative electrode tab 12a, the positive electrode tab 11a is allowed to have a plate thickness which is thicker than current 0.4 mm.

More specifically, since the width of the focus margin is proportional to the plate thickness, when the width of the focus margin of the positive electrode tab 11a is set to a range from 1.0 mm to 0.6 mm, the plate thickness of the positive electrode tab 11a can be increased up to 1.67 (=1.0/0.6) times. That is, the plate thickness of the positive electrode tab 11a can be increased up to 0.67 mm (=0.4 mm×1.67).

Accordingly, when laser cutting is applied to the positive electrode tab 11a made of aluminum and the negative electrode tab 12a made of copper in a range of the focus margin of the negative electrode tab 12a, even if the plate thickness of the positive electrode tab 11a is increased up to 3.3 (=0.67 mm/0.2 mm) times the plate thickness of the negative electrode tab 12a, the positive electrode tab 11a can be cut while suppressing the height of a burr.

Thus, when two kinds of plate materials with different melting points are cut by the laser according to a series of operations, a maximum value can be set for a plate thickness of a plate material with a lower melting point according to the width of the focus margin of a plate material with a higher melting point.

In FIG. 5A, the horizontal axis refers to the focus position of the laser (mm) observed on the assumption that the laser irradiated surface 11b and the laser irradiated surface 12b are zero, and the vertical axis shows the kerf width (μm) corresponding to a change of the focus position of the laser.

The kerf width is a width of a portion to be cut in laser cutting as shown in FIG. 5B. A smaller kerf width is accompanied by a smaller amount of a molten metal generated in laser cutting and enables highly accurate processing.

Shown by plots in the graph of FIG. 5A are widths of a kerf (mm) of the negative electrode tab 12a relative to focus positions of the laser. When the focus position of the laser is 0 mm, the focus position of the laser is aligned with the laser irradiated surface 12b of the negative electrode tab 12a. As shown in FIG. 5A, when the focus position of the laser is 0 mm, the kerf width is about 45 μm which is relatively large. A larger kerf width is considered to make a burr higher because a scattered laser melts the negative electrode tab 12a more than necessary and ruins a cut surface.

In contrast, when the focus position of the laser is −0.2 mm, the negative electrode 12a has the smallest kerf width. This coincides with aligning a focus of the laser with the undersurface 12c of the negative electrode tab 12a. Therefore, the negative electrode tab 12a is allowed to have the smallest kerf width by aligning the focus position of the laser to the opposite surface 12c of the laser irradiated surface 12b in the negative electrode tab 12a.

In FIG. 6, the horizontal axis refers to the gas pressure of an assist gas (MPa) supplied by the gas supply device 60 and the vertical axis refers to the maximum burr height (μm) corresponding to a gas pressure change.

In general, an inert gas is more suitable for laser cutting of aluminum than an oxygen gas, whereas an oxygen gas is suitable for laser cutting of copper. Therefore, when the positive electrode tab 11a made of aluminum and the negative electrode tab 12a made of copper are processed continuously, it is desirable to change conditions such as the type and pressure of an assist gas in the middle of the process.

In contrast, the laser cutting method according to the present embodiment uses air compressed to a high pressure of at least 1.5 MPa or more as a single assist gas. Shown by plots in the graph of FIG. 6 are the maximum burr heights (μm) obtained when the gas pressure is changed from 1.5 MPa to 2.0 MPa. White plots in the graph of FIG. 6 show maximum burr heights of the positive electrode tab 11a made of aluminum and black plots therein show maximum burr heights of the negative electrode tab 12a made of copper.

From the graph of FIG. 6, it is understood that the maximum burr heights can be suppressed in both the positive electrode tab 11a made of aluminum and the negative electrode tab 12a made of copper by setting the gas pressure to at least 1.5 MPa or more. Therefore, when compressed air is used as an assist gas, generation of a burr in the negative electrode tab 12a made of copper can also be suppressed.

This is because the absolute amount of supplied oxygen is considered to increase by turning compressed air into a high pressure. In addition, since about 80% of air is nitrogen which is an inert gas, generation of a burr can be suppressed in the positive electrode tab 11a made of aluminum. Furthermore, since compressed air is turned into a high pressure of 1.5 MPa or more, a molten metal of aluminum or copper can be blown off by blowing compressed air and generation of a burr in laser cutting can be suppressed.

As stated above, the positive electrode tab 11a and the negative electrode tab 12a can be processed continuously under the same conditions without changing conditions of the assist gas. By using a single assist gas, it is possible to shorten the processing time and simplify the facility. Using compressed air also makes it possible to suppress running costs in comparison with the case of using rare gases.

According to the above embodiment, the following effects are exhibited.

By aligning a focus position of the laser with the opposite surface 12c of the negative electrode tab 12a which has a thinner plate width and a higher melting point than the positive electrode tab 11a, scattering of the laser in the interval of plate thicknesses between the positive electrode tab 11a and the negative electrode tab 12a can be suppressed in comparison with the case of aligning a focus position of the laser with the top surface of the positive electrode tab 11a and the negative electrode tab 12a.

Accordingly, it is possible to suppress ruining of a cut surface due to a scattered laser which melts the positive electrode tab 11a and the negative electrode tab 12a more than necessary and laser cutting can be applied continuously to the positive electrode tab 11a and the negative electrode tab 12a each of which has a different thickness. As a result, the height of a burr can be suppressed in cutting, while enabling reduction of time spent for processing the positive electrode tab 11a and the negative electrode tab 12a each of which has a different thickness.

Although this invention has been described by way of the specific embodiment above, this invention is not limited to the above embodiment. It is possible for a person skilled in the art to modify or alter the above embodiment in various manners within the technical scope of the present invention.

For example, in the aforementioned embodiment of the present invention, the machining head 40 is moved by driving the XY stage 50, but parallel transition of the table 20 relative to the machining head 40 may be realized while fixing the machining head 40.

For the above description, the contents of Japanese Patent Application No. 2010-234722 filed on Oct. 19, 2010 are hereby incorporated by reference.

The invention claimed is:

1. A laser beam cutting method for cutting a first plate made of a first material, having a first melting point and having a first thickness, and for cutting a second plate made of a second material, having a second melting point and having a second thickness, the second melting point not being the same as the first melting point, the second thickness not being the same as the first thickness, by irradiating the plates with a laser beam, the laser beam cutting method comprising:

a plate material placement process for placing the first and second plates side by side so that the laser beam can only irradiate one plate at a time and out of the first and second plates, an opposite surface of a laser beam irradiated surface of the plate material with a lower melting point extends further from the laser irradiated surface than an opposite surface of the laser beam irradiated surface of the plate with a higher melting point;

a focus adjustment process for aligning a focus length of the laser beam with the opposite surface of the laser beam irradiated surface of the plate with the higher melting point of the first and second plates; and a plate material cutting process for cutting the first and second plates through irradiation with the laser beam according to a series of operations while maintaining constant the focus length of the laser beam such that when the laser beam irradiates the plate with the higher melting point it is focused at the opposite surface of the laser beam irradiated surface of the plate with the higher melting point.

2. The laser cutting method according to claim 1, wherein out of the first and second plates, a maximum value of a plate thickness of the plate with the lower melting point is set according to a tolerance of the focus length of the plate with the higher melting point and a maximum value of thickness of the plate with the lower melting point is made smaller as the tolerance of the focus length of the plate with a higher melting point becomes narrower.

3. The laser beam cutting method according to claim 2, wherein:
out of the first and second plates, the plate with a material having the lower melting point is an aluminum plate and the plate with a material having the higher melting point is a copper plate; and
the maximum value of the thickness of the plate with the material having the lower melting point is set to 3.3 times the plate thickness of the plate having a material with the higher melting point.

4. The laser beam cutting method according to claim 1, wherein
the plate material placement process places the first and second plates side by side so that the laser irradiated surfaces thereof are flush with each other before the focus adjustment process.

5. The laser beam cutting method according to claim 1, further comprising
a gas blowing process for blowing an assist gas to the first and second plates along with irradiation with the laser in order to assist cutting by the laser, and
the first and second plates are cut continuously while supplying the assist gas.

6. The laser beam cutting method according to claim 5, wherein the first and second plates are cut continuously while sustaining conditions to supply the assist gas.

7. The laser beam cutting method according to claim 1, wherein
out of the first and second plates, the plate with the lower melting point is a positive electrode tab of a laminated battery and the plate with the higher melting point is the negative electrode tab of the laminated battery; and
the positive electrode tab and the negative electrode tab are formed to be thicker than a collector foil for use in formation of electrodes of the laminated battery.

8. A laser beam cutting method for cutting a first plate made of a first material, having a first melting point and having a first thickness, and for cutting a second plate made of a second material, having a second melting point and having a second thickness, the second melting point not being the same as the first melting point, the second thickness not being the same as the first thickness, by irradiating the plates with a laser beam, the laser beam cutting method comprising:
a plate material placement process for placing the first and second plates side by side so that the laser beam can only irradiate one plate at a time and out of the first and second plates, an opposite surface of a laser beam irradiated surface of the plate material with a lower melting point extends further from the laser beam irradiated surface than an opposite surface of the laser beam irradiated surface of the plate with a higher melting point;
a focus adjustment process for aligning a focus length of the laser beam with the opposite surface of the laser beam irradiated surface of the plate with the higher melting point of the first and second plates; and
a plate material cutting process for cutting the first and second plates through irradiation with the laser beam according to a series of operations while maintaining constant the focus length of the laser beam such that when the laser beam irradiates the plate with the higher melting point it is focused at the opposite surface of the laser beam irradiated surface of the plate with the higher melting point,
wherein out of the first and second plates, the plate with the lower melting point is a positive electrode tab of a laminated battery and the plate with the higher melting point is the negative electrode tab of the laminated battery; and
the positive electrode tab and the negative electrode tab are formed to be thicker than a collector foil for use in formation of electrodes of the laminated battery.

* * * * *